US011969883B2

(12) United States Patent
Nishikawa (10) Patent No.: US 11,969,883 B2
(45) Date of Patent: Apr. 30, 2024

(54) HANDLING METHOD AND APPARATUS FOR STACKED BOX

(71) Applicant: RYOEI Co., Ltd., Aichi Prefecture (JP)

(72) Inventor: Shoji Nishikawa, Aichi prefecture (JP)

( * ) Notice: Subject to any disclaimer, the term of this patent is extended or adjusted under 35 U.S.C. 154(b) by 219 days.

(21) Appl. No.: 17/367,492

(22) Filed: Jul. 5, 2021

(65) Prior Publication Data

US 2022/0040864 A1 Feb. 10, 2022

(30) Foreign Application Priority Data

Aug. 5, 2020 (JP) ................................. 2020-133079

(51) Int. Cl.
*B25J 15/00* (2006.01)
*B25J 19/02* (2006.01)
*B65G 59/02* (2006.01)

(52) U.S. Cl.
CPC ....... *B25J 15/0014* (2013.01); *B25J 15/0028* (2013.01); *B25J 15/0052* (2013.01); *B25J 19/023* (2013.01); *B65G 59/023* (2013.01)

(58) Field of Classification Search
CPC B25J 15/0014; B25J 15/0028; B25J 15/0052; B25J 19/023; B65G 56/023
USPC ........................................................ 294/213
See application file for complete search history.

(56) References Cited

U.S. PATENT DOCUMENTS

| | | | | |
|---|---|---|---|---|
| 4,911,608 A | * | 3/1990 | Krappitz | B25J 13/086 414/796 |
| 6,412,844 B1 | * | 7/2002 | Hendzel | B65G 47/90 294/201 |
| 6,932,557 B2 | * | 8/2005 | Downs | B65G 47/90 414/730 |
| 8,733,810 B2 | * | 5/2014 | Oda | B25J 15/0004 414/730 |
| 10,358,241 B2 | * | 7/2019 | Findlay | B25J 11/0045 |
| 10,440,870 B1 | * | 10/2019 | Solanki | H05K 13/0408 |
| 10,556,338 B1 | * | 2/2020 | Marchese | B25J 15/0475 |
| 10,639,800 B2 | * | 5/2020 | Kamranzadeh | B65G 61/00 |

(Continued)

FOREIGN PATENT DOCUMENTS

| | | |
|---|---|---|
| JP | 4-244391 | 9/1992 |
| JP | H6-206634 A | 7/1994 |
| JP | 2014-176926 A | 9/2014 |

OTHER PUBLICATIONS

Machine-assisted English language translation of Patent Publication No. JP 2014-176926 A extracted from www.espacenet.com on Jul. 5, 2021; 9 pages.

*Primary Examiner* — Paul T Chin
(74) *Attorney, Agent, or Firm* — Dean W. Amburn (57) ABSTRACT

A handling method and apparatus for a stacked box can pull vertically upward and take out a stacked box having an open top surface. The handling method and apparatus gripes and moves the stacked box having an open top surface with the handling apparatus attached to a robot arm. The handling apparatus is moved to above a stacked uppermost box, a wedge member having a flat plate shape is inserted along outer surfaces of two opposite edges of an upper box, a claw provided to the wedge member is projected in a direction approaching the box and engaged with a lower surface of an outer flange of the box, and the box is lifted vertically upward and then a fall prevention hanger is driven on a lower side of the box to cause the box to be gripped by the handling apparatus and then moved by the robot arm.

15 Claims, 9 Drawing Sheets

(56) References Cited

U.S. PATENT DOCUMENTS

| | | | |
|---|---|---|---|
| 11,642,797 B2* | 5/2023 | Chintalapalli Patta | ............ B25J 15/106 294/86.4 |
| 2009/0097956 A1* | 4/2009 | Landes | ............ B65B 35/16 414/788.3 |
| 2019/0126493 A1* | 5/2019 | Jonas | ............ B25J 9/1694 |

* cited by examiner

ARROW A ⇒

VIEW OF ARROW A

HANDLING METHOD AND APPARATUS FOR STACKED BOX

TECHNICAL FIELD

The present invention relates to a handling method and apparatus for a stacked box, for moving a stacked box having an open top surface by using a robot arm.

BACKGROUND

In order to handle a box with a closed top surface, such as a cardboard box, a handling apparatus that suctions a top surface of the box by using a robot arm is widely used as shown in Japanese Patent JP2014-176926A, incorporated herein by reference. However, since a resin box, which is often used as a returnable box for parts and the like in factories, is a box with an open top surface, the top surface cannot be suctioned. For this reason, manual handling is performed in many cases. However, when a weight is heavy and boxes are stacked in multiple stages, manual handling is not easy.

In such a case, there is a method of lifting and moving by inserting a fork of a forklift on a lower surface of a box. However, this method can only be used when there is a large open space beside the stacked boxes. Further, even for an uppermost box, when it is desired to move a box located inside, a box in front needs to be removed first.

Further, Japanese Patent JPH6-206634A, which is incorporated herein by reference, discloses a handling device that hooks a claw on a downward bending piece of an upper flange on one side of a box, pulls outward to form a space between with an adjacent box, and uses that space to hook the claw on an opposite side of the box to lift. However, this device can only be used for boxes having the upper flange with the downward bending piece, and cannot be applied to many boxes having a flange that extends only in a horizontal direction.

Figure 13:
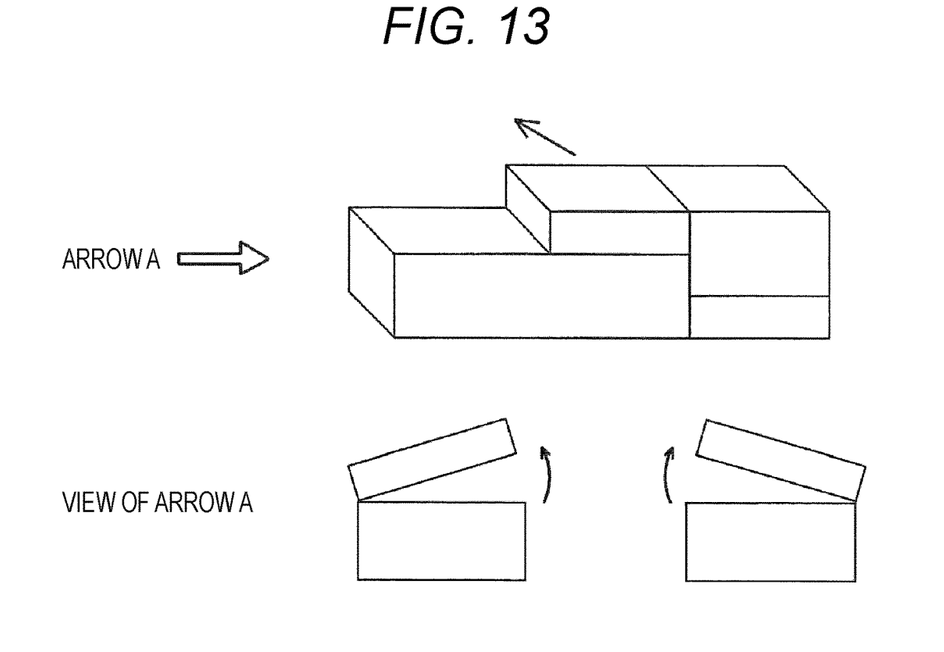
FIG. 13 is an explanatory view showing a conventional technique.
Figure 14:
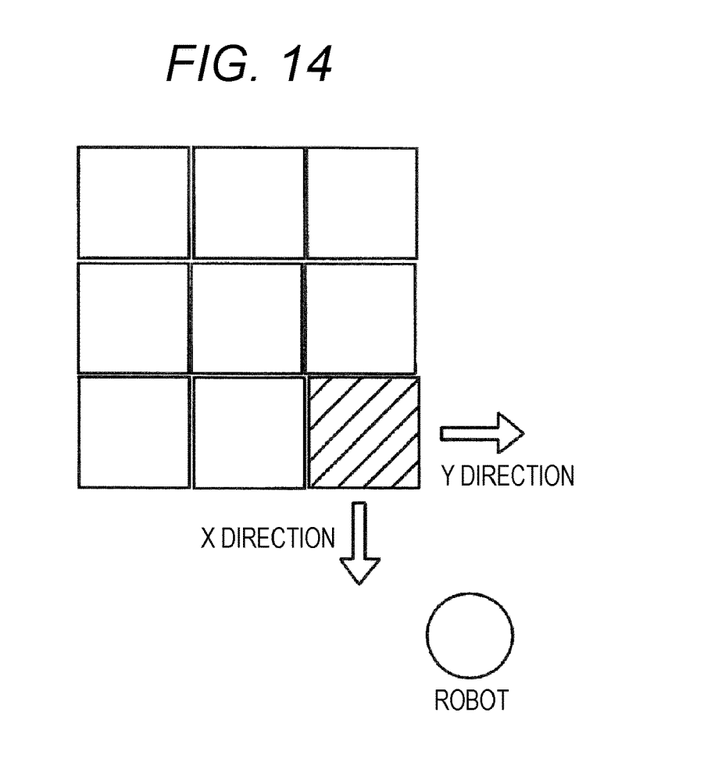
FIG. 14 is an explanatory view showing a conventional technique.

Further, this device can only be used when boxes of the same height are lined up. However, even when boxes of different sizes are stacked as shown in FIG. 13, by tilting an upper small box in either direction as shown in FIG. 13, the box will no longer fall into a lower box. This is because a protrusion for stage stacking (for stacking) is formed on a bottom surface of the box. A direction for tilting the box can be selected from an X direction or a Y direction as shown in FIG. 14. However, depending on a position of a box to be a target, tilting may not be possible.

Figure 15:
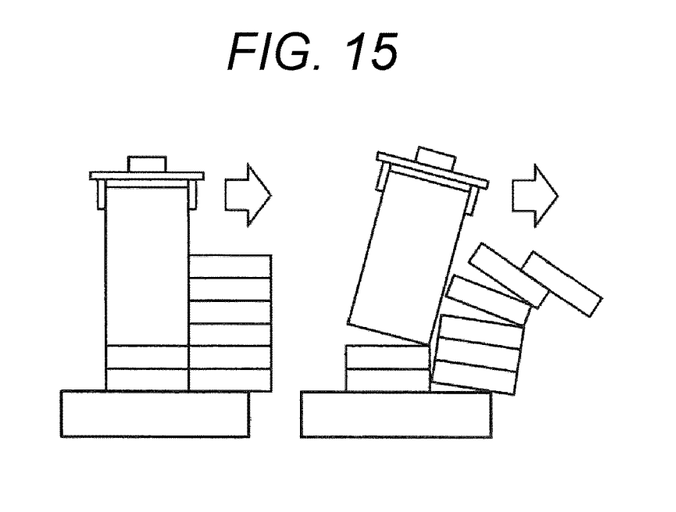
FIG. 15 is an explanatory view showing a problem in a conventional technique.
Figure 16:
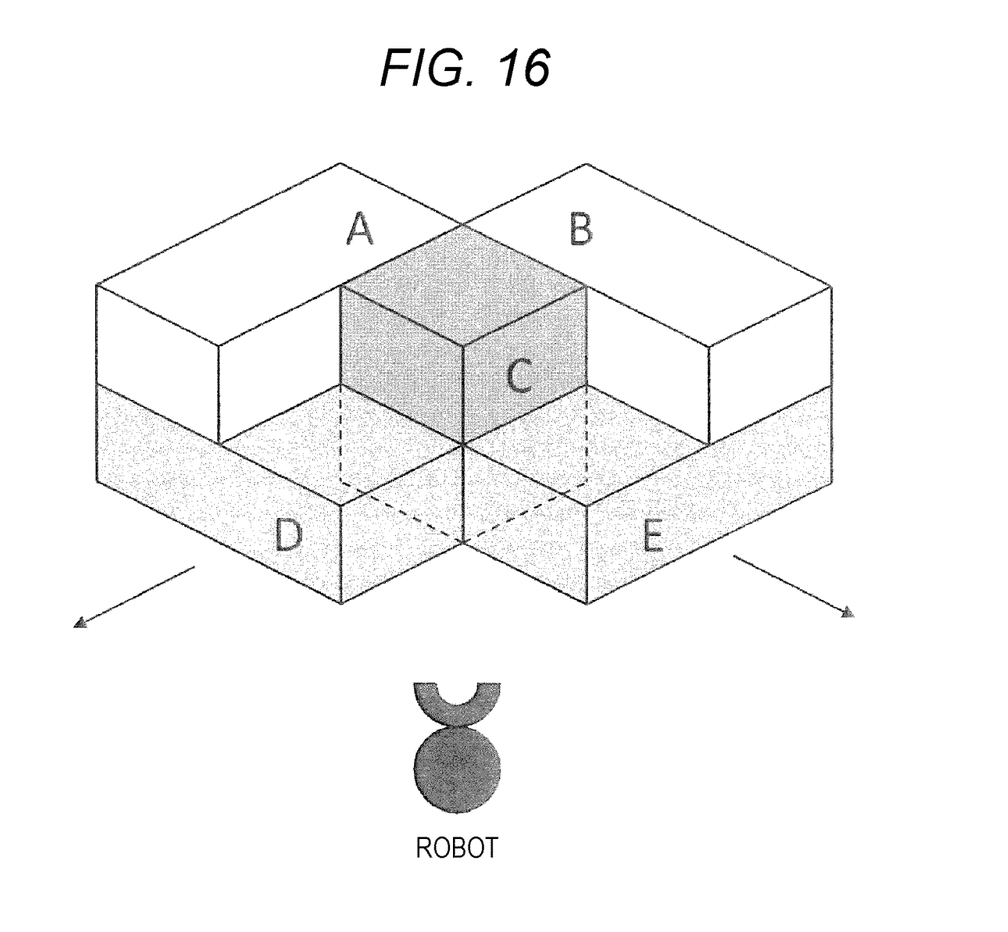
FIG. 16 is an explanatory view showing a problem in a conventional technique.

In addition, when a tall box is mixed as shown in FIG. 15, there is a possibility that adjacent boxes fall when the tall box is shifted obliquely. Furthermore, when boxes of different sizes are intricately combined and stacked as shown in FIG. 16, boxes A, B, C, D, and E interfere with each other. Therefore, it may not be possible to directly shift, pull, or tilt a targeted box.

SUMMARY

Therefore, an object of the present invention is to provide a handling method and a handling apparatus for a stacked box, which are capable of pulling vertically upward and taking out a stacked box with an open top surface.

A handling method for a stacked box according to the present invention made to solve the above problems includes a box handling method for gripping and moving a stacked box having an open top surface, with a handling apparatus attached to a robot arm. In a nonlimiting embodiment, the handling method includes: moving the handling apparatus to above a stacked box on an uppermost stage; inserting a wedge member having a flat plate shape along an outer surface of the box on the uppermost stage; rotating a claw provided to the wedge member in a direction approaching the box, to be engaged with a lower surface of an outer flange of the box; lifting the box vertically upward and then driving a fall prevention hanger on a lower side of the box to cause the handling apparatus to grip the box; and then causing the robot arm to move.

Meanwhile, in a nonlimiting embodiment it is preferable to press two opposite edges of the box with a pressing pad to make it easy to tilt or shift the box, form a slight gap between an adjacent box, and then insert the wedge member having a flat plate shape.

Further, in a nonlimiting embodiment a handling apparatus for a stacked box according to the present invention made to solve the above problems is a stacked box handling apparatus that is attached to a robot arm to grip and move a stacked box having an open top surface. The stacked box handling apparatus includes: a pressing pad that presses upper end surfaces of two opposite edges of a box on an uppermost stage; a wedge member that has a flat plate shape and is inserted along outer surfaces of the two opposite edges of the box of the uppermost stage; a claw that is provided to the wedge member, and is rotated in a direction approaching the box to be engaged with a lower surface of an outer flange of the box; and a fall prevention hanger that is driven on a lower side of the box hooked on the claw and lifted.

Meanwhile, in a nonlimiting embodiment it is preferable to have a structure in which the fall prevention hanger, and the wedge member having a flat plate shape and including the above-mentioned claw, are individually mounted on a pair of sliders, and the pair of sliders are made slidable in accordance with a size of the box.

There are advantages of the invention. According to the present invention, the two opposite edges of the box are pressed by the pressing pad, the wedge member having a flat plate shape is inserted along the outer surface of the box, the claw provided to the wedge member is rotated in a direction approaching the box to be engaged with the lower surface of the outer flange of the box, and the box is lifted vertically upward. Thus, there is no need to significantly shift the box laterally for inserting a griper as in the past. Therefore, the targeted box can be easily taken out. Further, even when the outer flange of the box does not have a downward bending piece, it is possible to handle without any trouble, which provides an advantage of excellent versatility.

BRIEF DESCRIPTION OF THE DRAWINGS

Referring now to the drawings, exemplary nonlimiting embodiments are shown. Although the drawings represent nonlimiting embodiments, the drawings are not necessarily to scale and certain features may be exaggerated to better illustrate and explain an aspect of the invention. Further, the exemplary embodiments described herein are not intended to be exhaustive or otherwise limiting or restricted to the precise form and configuration shown in the drawings and disclosed in the following detailed description and claims. Exemplary embodiments of the invention are described in reference to the drawings as follows:

DETAILED DESCRIPTION

Figure 1:
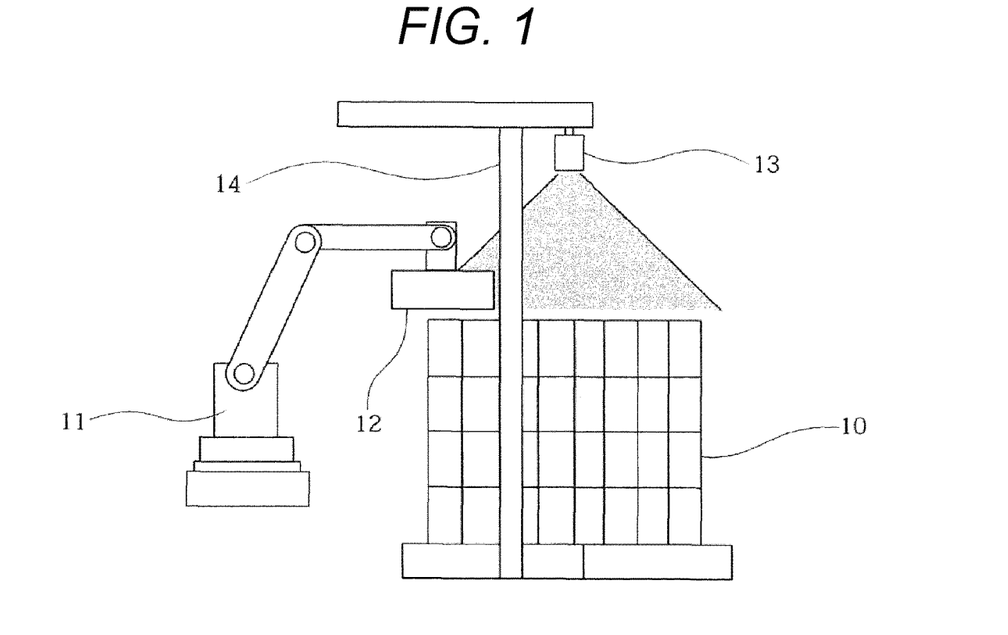
FIG. 1 is an overall conceptual view of a nonlimiting embodiment of the invention as shown in its environment of use.
Figure 2:
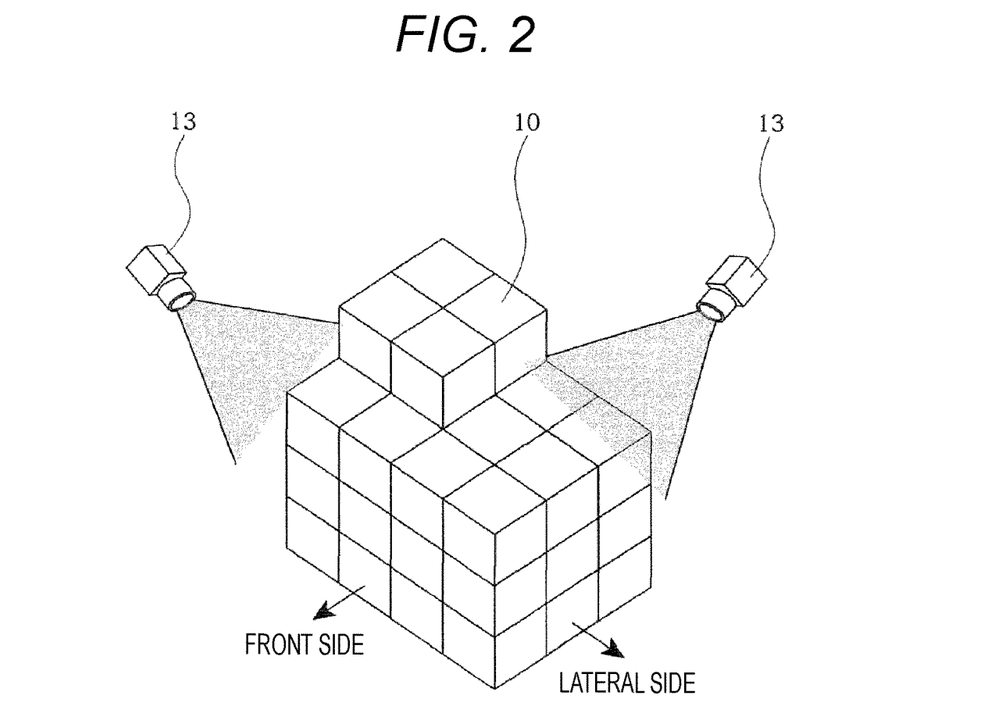
FIG. 2 is a conceptual view showing image capturing with a camera.

Hereinafter, nonlimiting embodiments of the present invention will be described with reference to the figures. FIG. 1 is an overall conceptual view of a nonlimiting embodiment of the invention in which each box 10 in a stack of boxes includes an open top surface and is stacked on a pallet. A handling apparatus 12 of the present invention is attached to a distal end of an arm of a robot 11 arranged in the vicinity of the box 10. A camera 13 is attached to a support column 14 for scanning the boxes. As shown in FIG. 2, more than one camera 13 is arranged so as to be able to capture an image of the stacked boxes from a plurality of directions. Then, coordinates of an uppermost box 10 are calculated, and the handling apparatus 12 is moved to a position directly above the targeted box 10. For this purpose, by recognizing a rectangular shape of the uppermost box from images of the individual camera 13, and then finding a corner of the box, a box is defined as a rectangle formed by three or more corners. Next, a center point of each side is obtained, two centers of opposite edges of the box are calculated, and three-dimensional position coordinates are calculated. In this way, the coordinates of the uppermost box 10 can be calculated from each camera image. This technique is already known to those skilled in the art as a robot control technique using an image and is not a novel or nonobvious part of the present invention, and thus the description thereof will be omitted.

Figure 3:
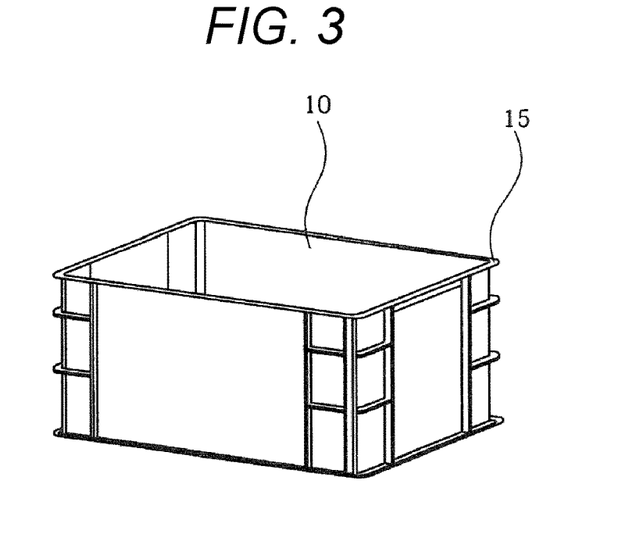
FIG. 3 is a perspective view of a box to be handled by the invention.

FIG. 3 shows the box 10 to be a handling target, according to the present embodiment. This box 10 is made of resin and has an open top surface, and an outer flange 15 is provided around the top surface. The outer flange 15 does not have a downward bending piece, but projects only in a horizontal direction. An amount of the projection is generally about 10 to 20 mm. Note that, even a box having a downward bending piece on an outer flange can be handled without any trouble.

Figure 4:
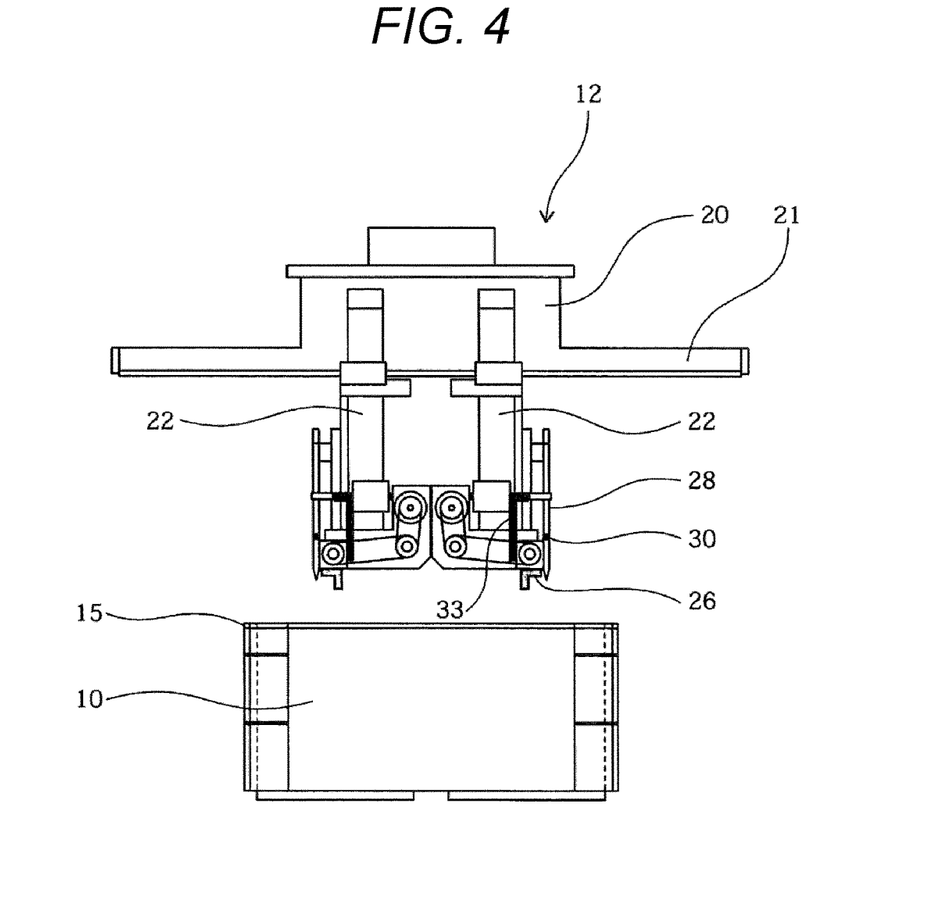
FIG. 4 is a front view of a handling apparatus of a nonlimiting embodiment of the invention shown in proximity to the box.
Figure 5:
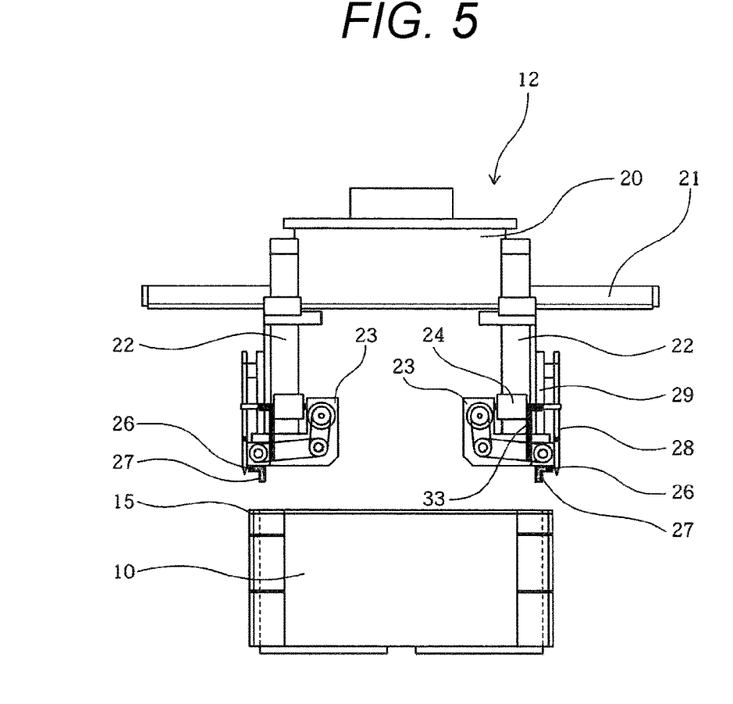
FIG. 5 is an explanatory view of the handling apparatus of FIG. 4 showing a state where a slider is moved in accordance with a size of the box.

FIG. 4 shows the entire handling apparatus 12 of the nonlimiting embodiment of the invention in proximity to the box 10. Reference numeral 20 is a main body attached to a distal end of a robot arm (not shown), and reference numeral 21 is a horizontal rail provided on the main body 20. At a lower part of the horizontal rail 21, a pair of sliders 22 are supported so as to be able to travel along the horizontal rail 21. For example, while a hydraulic cylinder can be used as a traveling actuator, an appropriate actuator such as a mechanism to travel by a motor along the horizontal rail 21 or a moving mechanism with a ball screw can be adopted. The pair of sliders 22 are expanded and contracted in accordance with a size of the box 10. FIG. 5 shows the expanded state.

Figure 6:
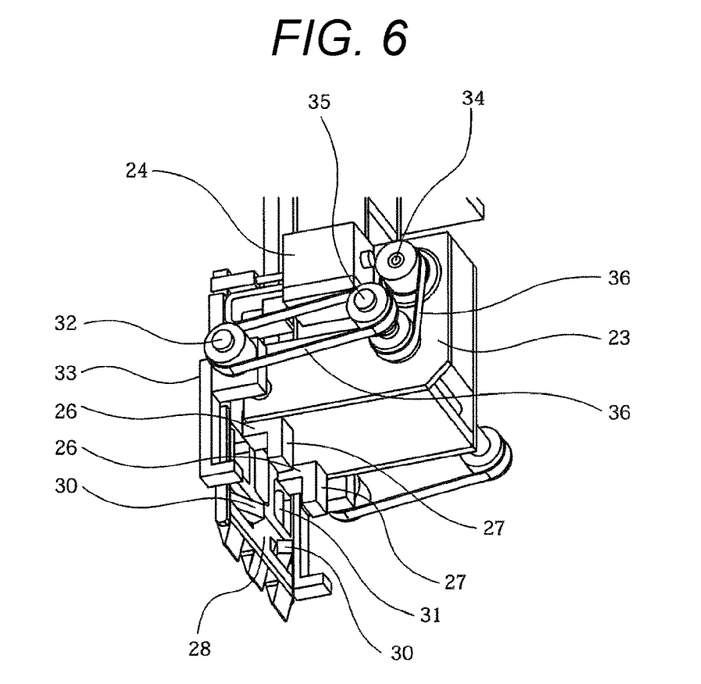
FIG. 6 is a perspective view of a main part of the handling apparatus of FIG. 4.

As shown in FIGS. 5 and 6, a drive box 23 is provided at a lower part of each slider 22. On a bottom surface of the drive box 23, a pair of pressing pads 26 are provided downward. The pair of pressing pads 26 have an inverted L-shape provided with a hanging piece 27, and the slider 22 is expanded and contracted so that the hanging piece 27 enters inside an upper end surface of the targeted uppermost box 10. As will be described later, pressing two opposite edges of the box 10 with these pressing pads 26 makes it easy to tilt or shift the box 10, and can form a slight gap between with an adjacent box.

Figure 7:
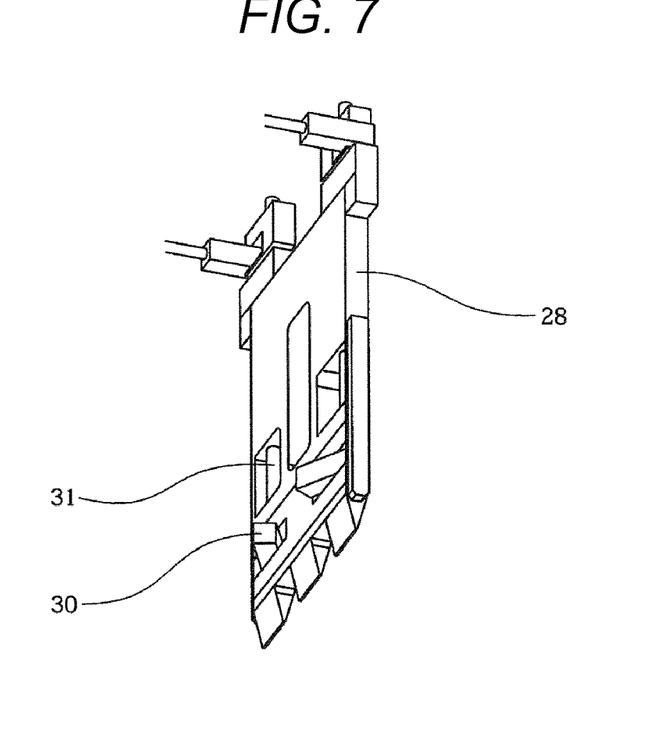
FIG. 7 is a conceptual view showing a claw rotation mechanism of the handling apparatus of FIG. 4.

On an outer surface of the drive box 23, a wedge member 28 having a substantially flat plate shape is provided so as to be able to be lifted and lowered by a lifting and lowering means 29. As shown in FIG. 6, the wedge member 28 has a sharp lower end and a hollow upper portion, and accommodates a pair of claws 30 inside, as shown in FIG. 7. Each of the claws 30 is rotated around a vertical shaft 31 by a link mechanism, and can protrude on a back surface (a surface on the box 10 side) of the wedge member 28. Reference numeral 24 is a drive source of the link mechanism.

Figure 10:
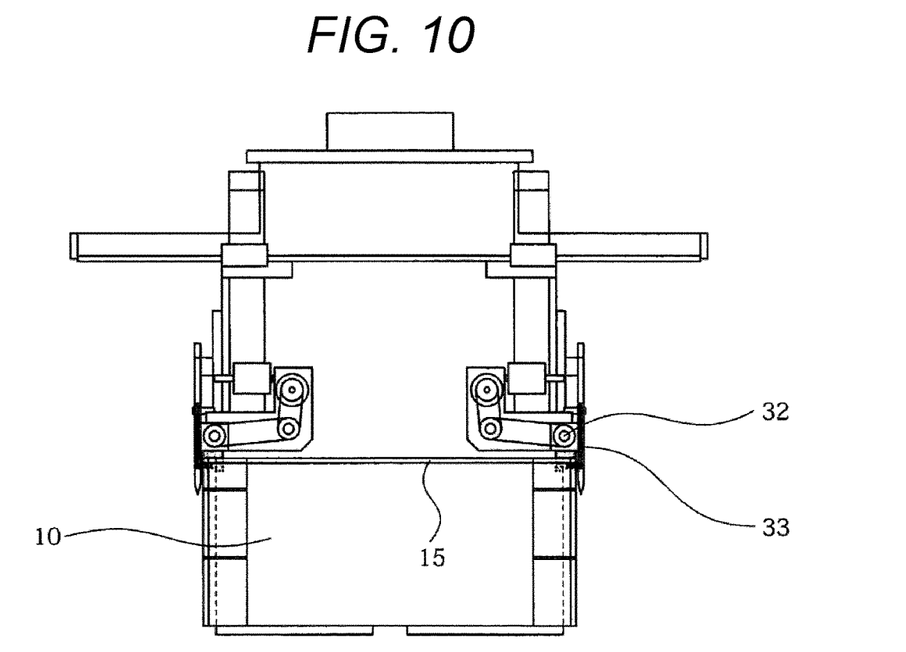
FIG. 10 is an explanatory view showing a state where a fall prevention hanger of the handling apparatus of FIG. 4 is driven.

Further, as shown in FIG. 6, at positions on both sides of the wedge member 28 of the drive box 23, a fall prevention hanger 33 that rotates approximately 180 degrees around a horizontal shaft 32 is provided. Between the shaft 32 and a drive shaft 34, an intermediate shaft 35 is provided, and a belt 36 rotates the fall prevention hanger 33. FIG. 4 shows a state where the fall prevention hanger 33 is in an upper position, and FIG. 10 shows a state where the fall prevention hanger 33 is swung down. A distal end of the fall prevention hanger 33 is bent in an L-shape so as to reliably support a lower surface of the outer flange 15 of the box 10.

Hereinafter, a handling method using the handling apparatus of the present invention will be described step by step.

First, as described above, the handling apparatus 12 is moved by the robot arm to above the targeted uppermost box 10 among the stacked boxes having an open top surface. As shown in FIG. 1, adjacent boxes are usually stacked in a substantially close contact state. After the handling apparatus is positioned above a center of the box 10 as shown in FIG. 4, the slider 22 is moved along the horizontal rail 21 in accordance with a size of the box 10 as shown in FIG. 5. Note that the position and the size of the targeted box 10 are calculated in advance on the basis of images of the plurality of cameras 13. Further, while there are two sets of two opposite edges of the box 10 on a long side and on a short side, it is calculated in advance which opposite edges are to be held, and an orientation of the handling apparatus 12 is adjusted.

Figure 8:
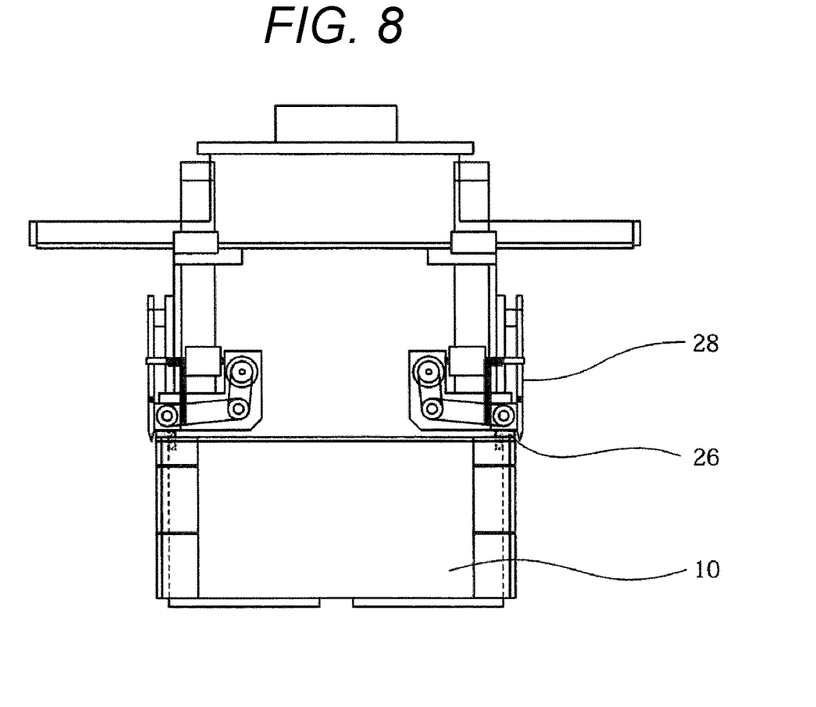
FIG. 8 is an explanatory view showing a state where a pressing pad of the handling apparatus of FIG. 4 presses an upper end portion of the box.
Figure 9:
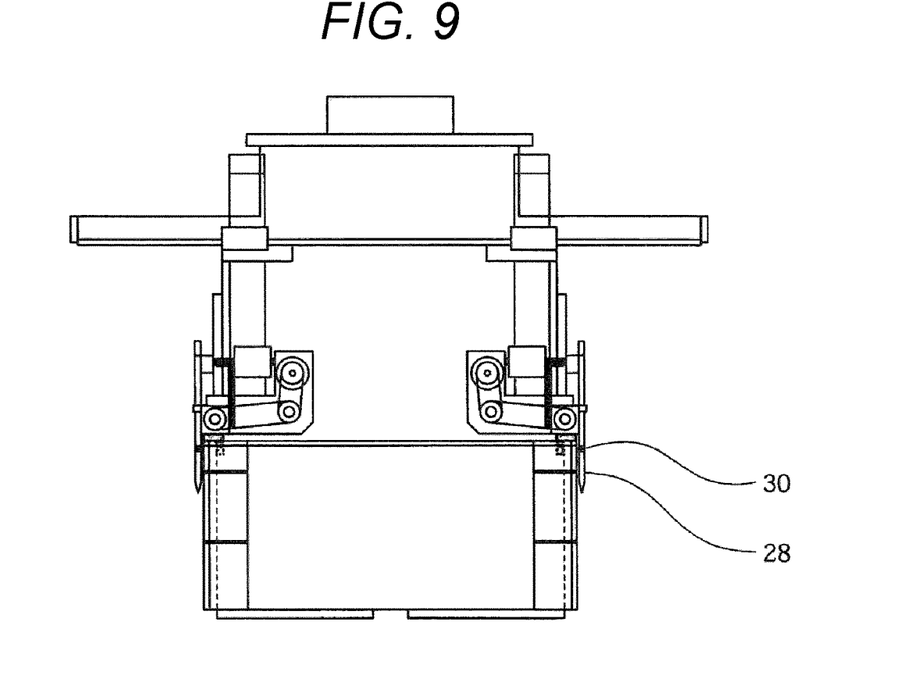
FIG. 9 is an explanatory view showing a state where a wedge member of the handling apparatus of FIG. 4 is driven.

Next, as shown in FIG. 8, the handling apparatus 12 is lowered toward the box 10 by a robot hand, and the pair of pressing pads 26 are brought into close contact with an upper end surface of the box 10. Then, the box 10 is laterally shifted by the robot hand so as to form a slight gap of about 3 to 10 mm between with the adjacent box 10. Then, the wedge member 28 is driven into this slight gap as shown in FIG. 9. This operation is performed on one side of the box 10, and then performed on an opposite side. Although the adjacent boxes 10 are substantially in close contact with each other, it is possible to forcibly shift by a small distance by the robot hand. This shift is for allowing the sharp lower end of the wedge member 28 to cut in, and does not need to be performed on a side with no adjacent box 10. The above operation is illustrated in progressive detail in (A), (B), and (C) of FIG. 11 and (A), (B), and (C) of FIG. 12.

Figure 11:
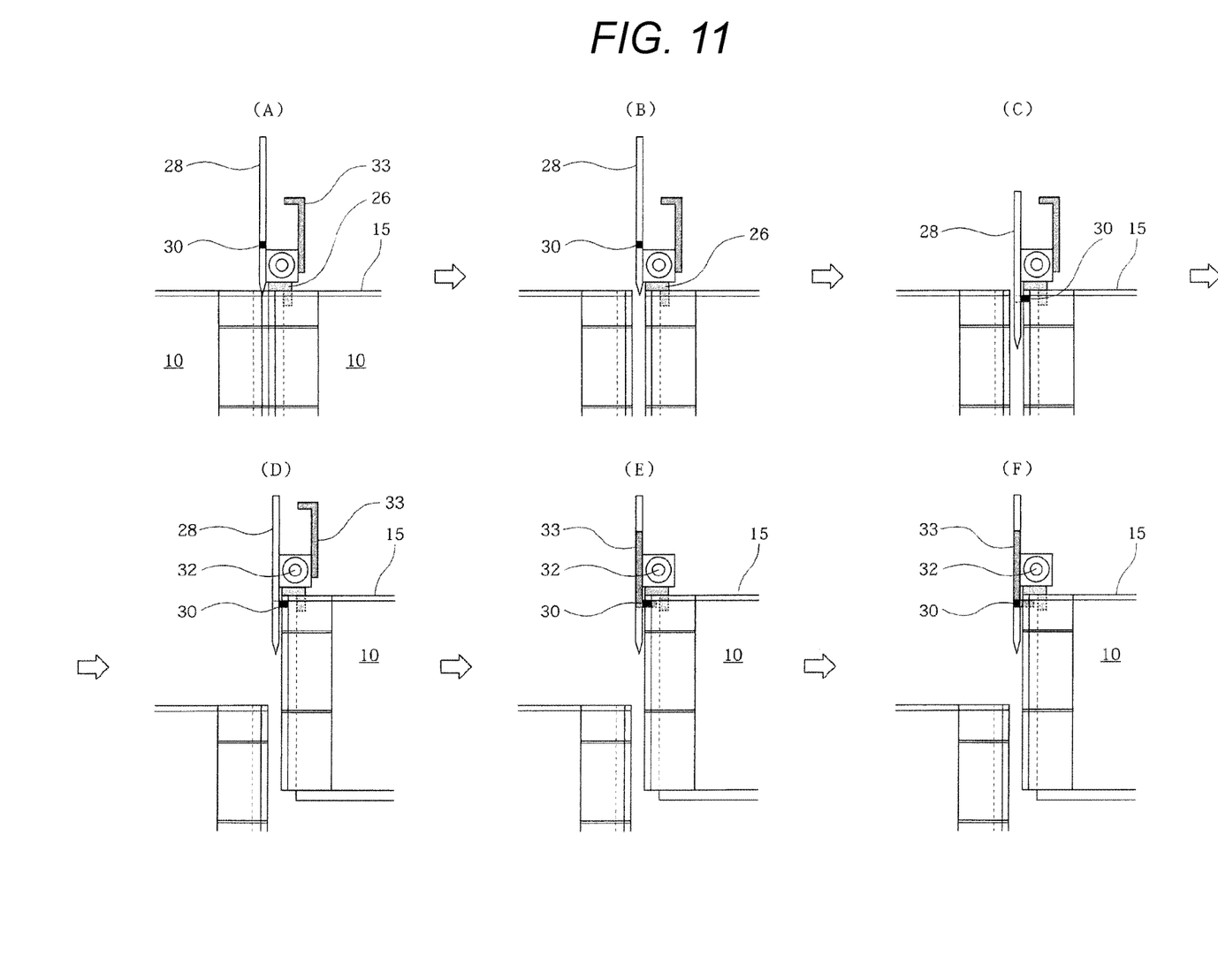
FIG. 11 is an enlarged view of a main part of the handling apparatus of FIG. 4, showing steps of a handling operation method of a nonlimiting embodiment of the invention.

When the wedge member 28 is driven, the claw 30 is accommodated inside the wedge member 28 so as not to interfere with the driving. After the wedge members 28 is driven on both sides of the box 10, as shown in (C) of FIG. 11, the claw 30 rotates around the vertical shaft 31 and protrudes on the back surface side of the wedge member 28. An amount of the protrusion of the claw 30 is, for example, about 10 mm. The protruding claw 30 is located below the outer flange 15 of the box 10. Then, when the entire handling apparatus is lifted directly upward by the robot arm, a top surface of the protruding claw 30 engages with the lower surface of the outer flange 15 of the box 10, and the box 10 is pulled vertically upward by the claws 30 on both sides as shown in FIG. 11 (D). At this time, a side plate of the box 10 is held from inside by the pressing pad 26, and outside is restrained by the wedge member 28. Therefore, even if the amount of the protrusion of the claw 30 is small, the claw 30 does not come off from the outer flange 15 of the box 10.

Meanwhile, since the outer flange 15 of the box 10 shown in FIG. 3 exists only on the upper end surface, the claw 30 is hooked on the outer flange 15 on the upper end surface as shown in (C) and (D) of FIG. 11. However, some boxes are formed with the outer flange 15 not only on the upper end surface but also therebelow. In that case, the claw 30 is to engage with a lowermost outer flange 15.

Figure 12:
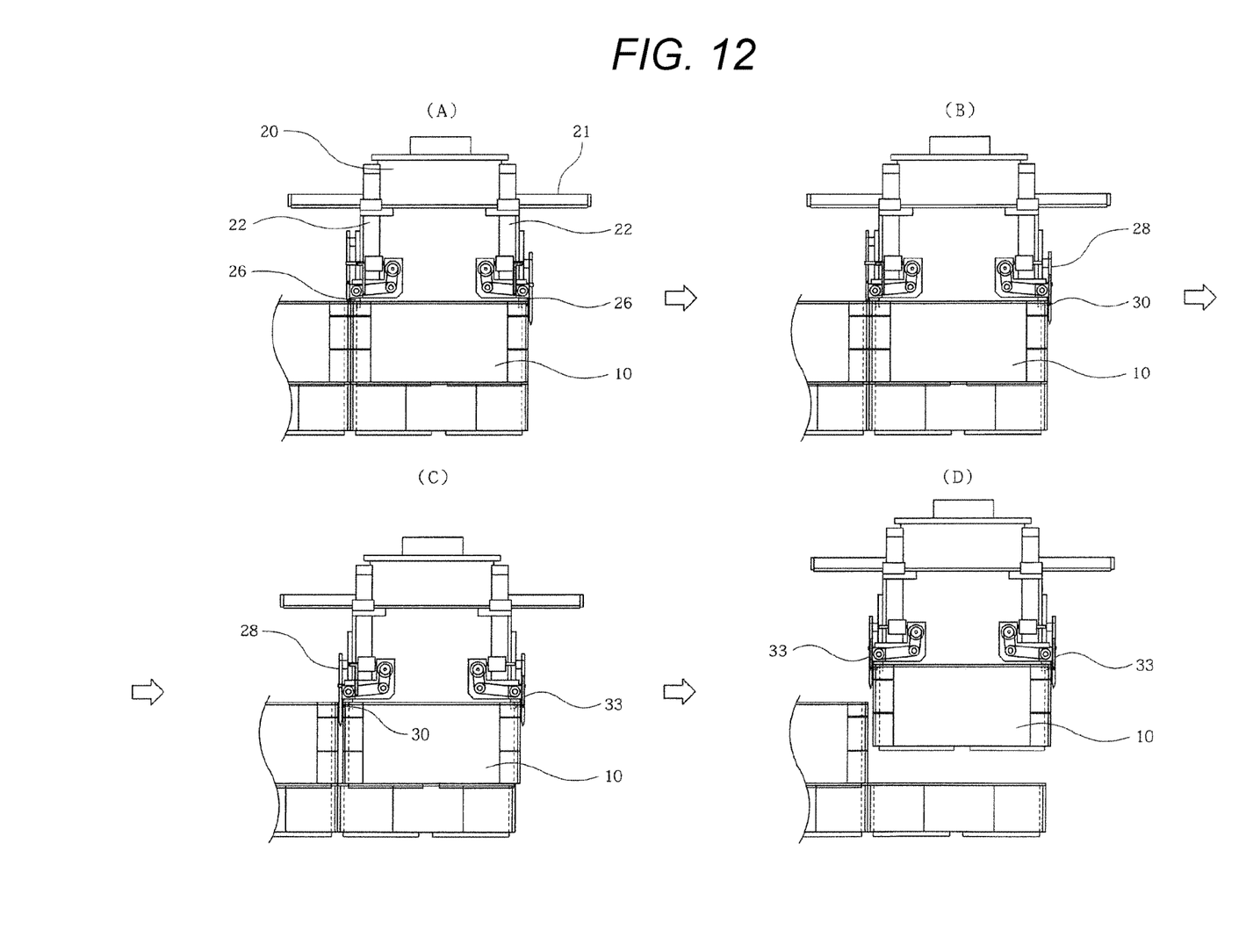
FIG. 12 is an overall view of the handling apparatus of FIG. 4 showing steps of a handling operation method of a nonlimiting embodiment of the invention.

In this way, after the uppermost box 10 is lifted vertically upward, as shown in (E) of FIG. 11, the fall prevention hanger 33, which has been in an upper position until then, is swung downward to support the lower surface of the outer flange 15 of the box 10. The fall prevention hanger 33 is swung about 3 mm on a lower side of the claw 30. In this way, the fall prevention hangers 33 are swung downward on both sides of the box 10 to reliably hold the outer flange 15 of the box 10 on both sides, and the robot arm moves the box 10 to a target position. Since the two opposite edges of the box 10 are reliably restrained by the fall prevention hanger 33, the box 10 does not fall during movement. Note that, in FIG. 12(C), only a right side of the fall prevention hanger 33 is swung down, but a left side with the adjacent box 10 is not swung down. As shown in FIG. 12(D), the left side is swung down after a space for swinging down the fall prevention hanger 33 is formed. When the box 10 is conveyed to the target position and the fall prevention hanger 33 is released, the claw 30 is retracted.

As described above, according to the handling method and apparatus for a stacked box according to the present invention, the targeted box 10 can be easily pulled out vertically upward and taken out even when adjacent boxes 10 are stacked exactly on top of each other. Therefore, the adjacent box 10 is not affected as in the past. Further, even when the outer flange of the box does not have a downward bending piece, it is possible to handle without any trouble, which provides excellent versatility. Further, the box is not dropped during conveyance, and there is an advantage of excellent safety.

Embodiments of the invention have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The following is a list of the reference numbers and associated elements:

10 box
11 robot
12 handling apparatus
13 camera
14 support column
15 outer flange
20 main body
21 horizontal rail
22 slider
23 drive box
24 drive source of link mechanism
26 pressing pad
27 hanging piece
28 wedge member
29 lifting and lowering means
30 claw
31 vertical shaft
32 shaft
33 fall prevention hanger
34 drive shaft
35 intermediate shaft
36 belt

What is claimed is:

1. A handling method for a box for gripping and moving a stacked box having an open top surface, with a handling apparatus attached to a robot arm, the handling method comprising:
   moving the handling apparatus to above a stacked box on an uppermost stage;
   inserting a wedge member having a flat plate shape along an outer surface of the box on the uppermost stage;
   rotating a claw provided to the wedge member in a direction approaching the box, to be engaged with a lower surface of an outer flange of the box;
   lifting the box vertically upward and then driving a fall prevention hanger on a lower side of the box to cause the handling apparatus to grip the box; and
   then causing the robot arm to move.

2. The handling method for a stacked box according to claim 1, wherein, after pressing of two opposite edges of the box with a pressing pad to make it easy to tilt or shift the box; and
   forming a slight gap between with an adjacent box, the wedge member having a flat plate shape inserted.

3. A handling apparatus for a stacked box, the handling apparatus being attached to a robot arm to grip and move a stacked box having an open top surface, the handling apparatus comprising:
   a pressing pad that presses upper end surfaces of two opposite edges of a box on an uppermost stage;

a wedge member that has a flat plate shape and is inserted along outer surfaces of the two opposite edges of the box of the uppermost stage;

a claw that is provided to the wedge member, and is rotated in a direction approaching the box to be engaged with a lower surface of an outer flange of the box; and a fall prevention hanger that is driven on a lower side of the box hooked on the claw and lifted.

4. The handling apparatus for a stacked box according to claim 3, wherein the fall prevention hanger, and the wedge member having a flat plate shape and including the claw, are individually mounted on a pair of sliders, and the pair of sliders are made slidable in accordance with a size and an orientation of the box.

5. A handling apparatus for a stacked box, the handling apparatus being attached to a robot arm to grip and move a stacked box having an open top surface, the handling apparatus comprising:

a main body having at least one horizontal rail;

at least one slider assembly adapted to move along the horizontal rail;

a wedge member disposed in the slider assembly, wherein the wedge member has a pointed end portion and is adapted to vertically move up and down;

at least one claw disposed in the wedge member, wherein the claw is adapted to be substantially flush with a side surface of the wedge member and rotatable outwardly from the side surface of the wedge member; and at one pressing pad disposed in the slider assembly, wherein the pressing pad is adapted to extend downwardly from the slider assembly in space apart parallel orientation with the wedge member, wherein the pressing pad has an inverted L-shape.

6. The handling apparatus for a stacked box according to claim 5, wherein the main body is attached to a robotic arm.

7. The handling apparatus for a stacked box according to claim 5, wherein the handling apparatus is robotically controlled by a robotic control system.

8. The handling apparatus for a stacked box according to claim 7, wherein the robotic control system comprises at least one camera.

9. A handling method for a box for gripping and moving a stacked box having an open top surface, with a handling apparatus attached to a robot arm, the handling method comprising:

robotically identifying a box to be moved wherein the box is on an uppermost stage of a plurality of stacked boxes, wherein the box has a flange projecting outwardly at least partially around an outer surface of the box proximate to an upper portion of the box;

robotically moving the handling apparatus to above the box;

inserting a wedge member having an edge and a flat plate shape between the outer surface of the box and a second outer surface of an adjacent box;

rotating a claw disposed in the wedge member in a direction approaching the box, to be engaged with a lower surface of the flange of the box; and robotically lifting the box vertically upward.

10. The handling method for a stacked box according to claim 9, further comprising:

prior to robotically lifting the box, on a side of the box not next to the adjacent box, driving a first fall prevention hanger on a lower side of the box to cause the handling apparatus to grip the box.

11. The handling method for a stacked box according to claim 10, further comprising:

after robotically lifting the box, on a side of the box next to the adjacent box, driving a second fall prevention hanger on a lower side of the box to cause the handling apparatus to grip the box.

12. The handling method for a stacked box according to claim 9, wherein after pressing of two opposite top edges of the box with a pressing pad to make it easy to tilt or shift the box; and forming a slight gap between with the second outer surface of the adjacent box, the wedge member having a flat plate shape inserted.

13. The handling method for a stacked box according to claim 9, wherein prior to inserting the wedge member between the outer surface of the box and the second outer surface of the adjacent box, forming a slight gap between the second outer surface of the adjacent box, the wedge member having a flat plate shape insertable in the slight gap.

14. A handling method for a box for gripping and moving a stacked box having an open top surface, with a handling apparatus attached to a robot arm, the handling method comprising:

robotically identifying a box to be moved wherein the box is on an uppermost stage of a plurality of stacked boxes, wherein the box has a flange projecting outwardly at least partially around an outer surface of the box;

robotically moving the handling apparatus to above the box;

inserting a wedge member having an edge and a flat plate shape along the outer surface of the box;

rotating a claw disposed in the wedge member in a direction approaching the box, to be engaged with a lower surface of the flange of the box;

on a side of the box not next to another one of the plurality of stacked boxes, driving a first fall prevention hanger on a lower side of the box to cause the handling apparatus to grip the box; and robotically lifting the box vertically upward.

15. A handling method for a box for gripping and moving a stacked box having an open top surface, with a handling apparatus attached to a robot arm, the handling method comprising:

robotically identifying a box to be moved wherein the box is on an uppermost stage of a plurality of stacked boxes, wherein the box has a flange projecting outwardly at least partially around an outer surface of the box;

robotically moving the handling apparatus to above the box;

inserting a wedge member having an edge and a flat plate shape along the outer surface of the box;

rotating a claw disposed in the wedge member in a direction approaching the box, to be engaged with a lower surface of the flange of the box;

on a side of the box not next to another one of the plurality of stacked boxes, driving a first fall prevention hanger on a lower side of the box to cause the handling apparatus to grip the box;

robotically lifting the box vertically upward; and after robotically lifting the box, on a side of the box next to another one of the plurality stacked boxes, driving a second fall prevention hanger on a lower side of the box to cause the handling apparatus to grip the box.

* * * * *

UNITED STATES PATENT AND TRADEMARK OFFICE
CERTIFICATE OF CORRECTION

PATENT NO. : 11,969,883 B2
APPLICATION NO. : 17/367492
DATED : April 30, 2024
INVENTOR(S) : Shoji Nishikawa It is certified that error appears in the above-identified patent and that said Letters Patent is hereby corrected as shown below:

In the Claims

Column 7, Line 29 Claim 5 between the word "at" and "one" please add the following text: "least"

Signed and Sealed this
Fifth Day of November, 2024

Katherine Kelly Vidal
*Director of the United States Patent and Trademark Office*